United States Patent [19]

Kaimai et al.

[11] 4,399,473
[45] Aug. 16, 1983

[54] APPARATUS FOR REPRODUCING VIDEO SIGNALS IN A SLOW-MOTION OPERATING MODE

[76] Inventors: Hiroyuki Kaimai; Masakazu Sonoda; Masaaki Komatsu; Atsuo Sakai; Toshimitsu Kamai, all c/o Sony Corporation, 7-35 Kitashinagawa 6-chome, Shinagawa-ku, Tokyo, Japan

[21] Appl. No.: 274,396

[22] Filed: Jun. 17, 1981

[30] Foreign Application Priority Data

Jun. 23, 1980 [JP] Japan .................................. 55-84851

[51] Int. Cl.³ ...................... H04N 5/78; G11B 21/04; G11B 19/28
[52] U.S. Cl. ..................................... 360/10.3; 360/70; 360/74.1
[58] Field of Search ...................... 360/10.2, 10.3, 70, 360/73, 74.1, 74.4

[56] References Cited

U.S. PATENT DOCUMENTS

| | | | |
|---|---|---|---|
| 3,678,186 | 7/1972 | Narita | 360/10.2 |
| 3,940,672 | 2/1976 | Vogel | 360/74.4 X |
| 3,943,562 | 3/1976 | Opelt | 360/10.3 |
| 4,101,936 | 7/1978 | Shinhara | 360/10.2 |
| 4,190,869 | 2/1980 | Ota | 360/73 X |
| 4,246,616 | 1/1981 | Hiraguri et al. | 360/10.2 |
| 4,276,571 | 6/1981 | Sakamoto | 360/10.2 |
| 4,295,170 | 10/1981 | Weiszbrod | 360/74.1 |
| 4,306,255 | 12/1981 | Misaki et al. | 360/10.3 |
| 4,322,755 | 3/1982 | Kosaka | 360/10.3 |

*Primary Examiner*—Aristotelis M. Psitos
*Attorney, Agent, or Firm*—Lewis H. Eslinger; Alvin Sinderbrand

[57] ABSTRACT

In an apparatus which reproduces video signals using rotating heads to scan oblique tracks formed on a tape, the tape is intermittently moved and stopped by a tape capstan motor which is driven by a motor drive pulse. The motor drive pulse is generated at predetermined time intervals corresponding to a predetermined number of tracks for slow-motion reproduction of the recorded video signals. Deviations in the amount of tape intermittently advanced, as measured by a predetermined number of tracks, is avoided by varying the pulse-width or amplitude of the motor drive pulse.

9 Claims, 15 Drawing Figures

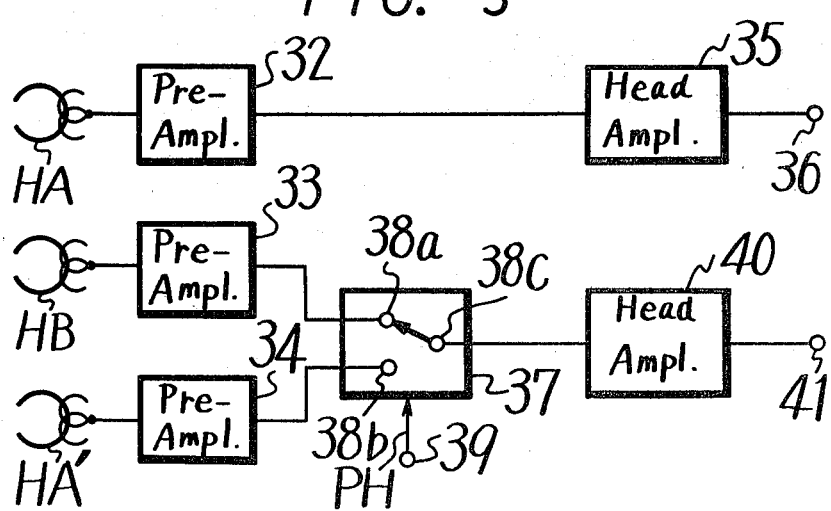

FIG. 4A
FIG. 4B
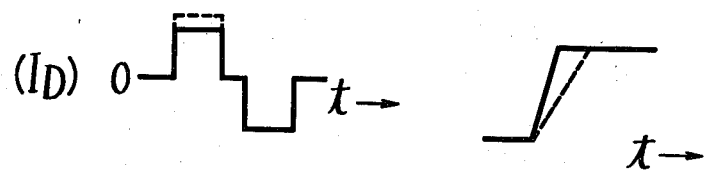
FIG. 5
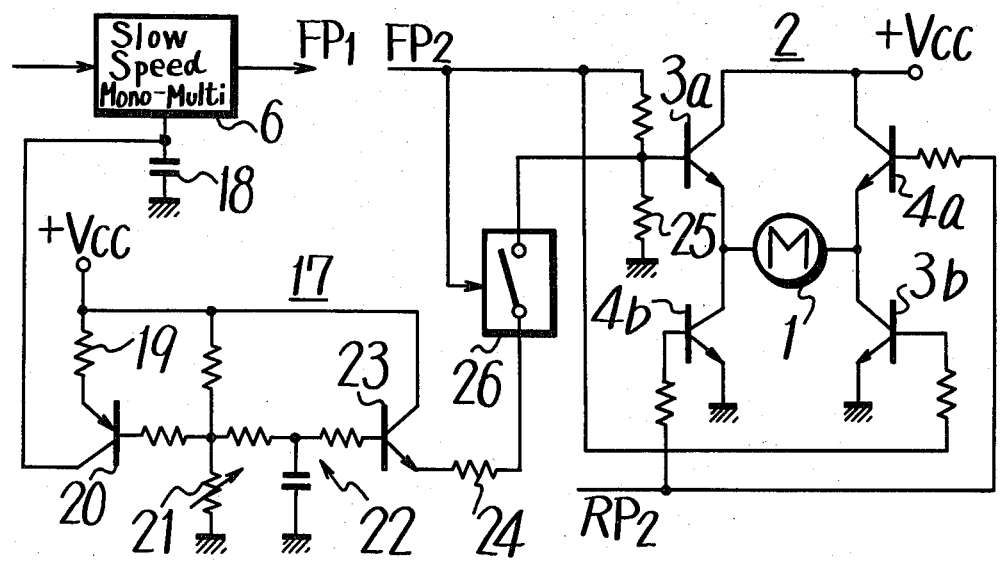
FIG. 6
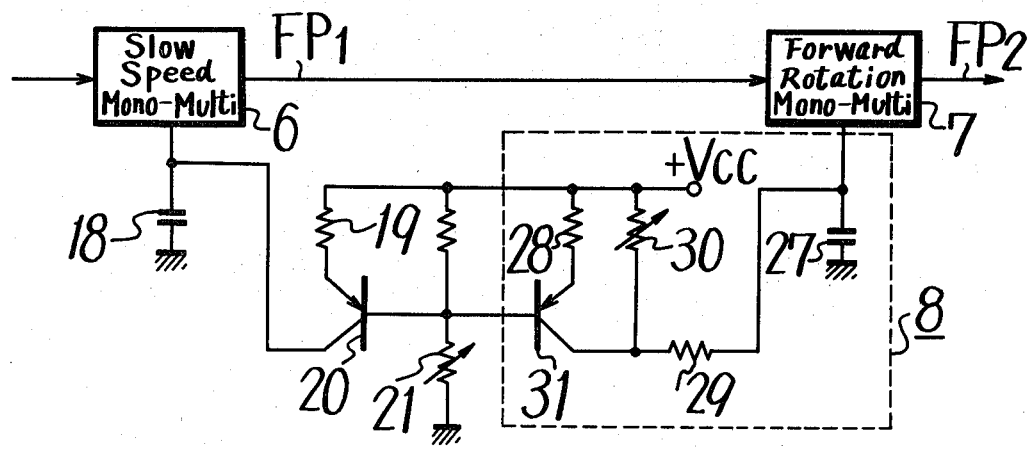

APPARATUS FOR REPRODUCING VIDEO SIGNALS IN A SLOW-MOTION OPERATING MODE

BACKGROUND OF THE INVENTION

1. Field of the Invention

The present invention relates to a video signal reproducing apparatus, and more particularly to an apparatus for performing slow-motion reproduction of video signals recorded on a tape by driving the tape intermittently.

2. Description of the Prior Art

In a helical scanning type of video recording and reproducing apparatus, the video signals are successively recorded by two rotating heads on tracks oblique to the longitudinal direction of a tape. Usually, the two rotating heads have different azimuth angles for the sake of high density recording, in which adjacent tracks of the tape are abutting or partially overlapping each other. However, the cross-talk signal from the adjacent tracks can be effectively reduced due to azimuth loss of the heads.

For slow-motion reproduction of these recorded video signals, the tape is driven at a speed which is slower than that used in the recording mode (or normal reproducing mode). Accordingly, in reproduction, the rotating heads repeatedly trace the respective tracks a number of times, whereby the reproduced picture has a slower motion than it would have if reproduced in a normal reproducing mode. It is in this way that slow-motion reproduction is achieved. Moreover, when the tape is stopped, a single track is repeatedly traced by the rotating heads to reproduce a still picture.

In the slow-motion reproducing mode or the still picture reproducing mode, the rotating heads rotate at the same speed as in the normal reproducing mode, while the tape is driven at a slower speed than in the normal reproducing mode or is stopped completely. As a result, the inclination angle of the track traced by the rotating head on the tape in the slow-motion and still picture reproducing mode differs from the inclination angle of the track in a recording mode (or normal reproducing mode) and this difference in inclination gives rise to tracking deviation.

In reproduction, when a rotating head having a first azimuth angle deviates from a track to be scanned and crosses another track which is recorded by a different rotating head having a second azimuth angle, a noise bar in the reproduced picture is generated.

In order to overcome the above-described disadvantage, previously known and diclosed an improved system, in U.S. Pat. No. 4,190,869, can be used in which the tape travels or shifts intermittently by rotating a motor driven capstan intermittently. During the time interval that the tape is stopped, the same tracks are scanned a number of times by rotating heads having azimuth angles corresponding to the tracks to be scanned, resulting in the still reproduction. On the other hand, during the time interval that the tape is moved at a normal speed, the normal reproducing mode is carried out by the rotating heads. The slow-motion reproduction is performed by combining the still and normal reproducing modes. It is herein noted that the number of times that the same track is scanned depends on the slow-motion speed.

With the tape being moved intermittently in the above manner by pulse-driving a capstan motor during normal reproduction, it is seen that a rising time of rotation of a capstan is changed in response to a slow-motion ratio 1/N. Consequently a change or deviation in the stop-position of the tape when reproducing in the still mode occurs because the mechanical energies stored in a driving force transmission mechanism, such as a belt interconnected between the capstan flywheel and the capstan motor, are different in response to the slow-motion ratio. Accordingly, the rising time of the capstan becomes shorter, as the slow-motion speed is faster.

As a result, a signal-to-noise ratio of the reproduced slow-motion picture will deteriorate gradually, since such deviations in the stop-positions are cumulative and therefore become greater each time the tape is stopped during the slow-motion reproduction.

SUMMARY OF THE INVENTION

Accordingly, it is an object of this invention to provide an improved video signal reproducing apparatus which avoids the foregoing disadvantage of the prior art.

More specifically, it is an object of this invention to provide a new apparatus for reproducing a slow-motion picture of video signals recorded on a tape which is transported intermittently.

In accordance with an aspect of this invention, an apparatus for reproducing video signals recorded on tracks which are obliquely formed on a tape comprises:

head means for scanning said tracks;

tape capstan motor means for driving said tape in a longitudinal direction of the latter;

tape driving means for generating a motor drive pulse, having a waveform shape, and a motor brake pulse which are applied to said capstan motor means and which respectively produce forward and reverse current flow through said tape capstan motor means effective for intermittently driving advancing the tape by an amount corresponding to a predetermined number of said tracks at time intervals which are determined in accordance with a selected slow-motion speed of advancement of said tape; and compensating means for varying the waveform shape of said motor drive pulse in accordance with said selected slow-motion speed.

The above and other objects, features and advantages of the present invention, will become apparent from the following detailed description which is to be read in conjunction with the accompanying drawings in which like references designate the same elements and parts.

BRIEF DESCRIPTION OF THE DRAWINGS

FIGS. 2A to 2I are respectively waveform diagrams which explain the operation of the circuit shown in FIG. 1;

FIG. 3 is a connection diagram showing an example of the circuit for amplifying the reproduced outputs from magnetic heads;

FIGS. 4A and 4B are waveform diagrams which explain the operation of a compensating circuit employed in the present invention; and FIGS. 5 and 6 are connection diagrams showing alternative embodiments of the present invention.

DETAILED DESCRIPTION OF THE PREFERRED EMBODIMENTS

Figure 1:
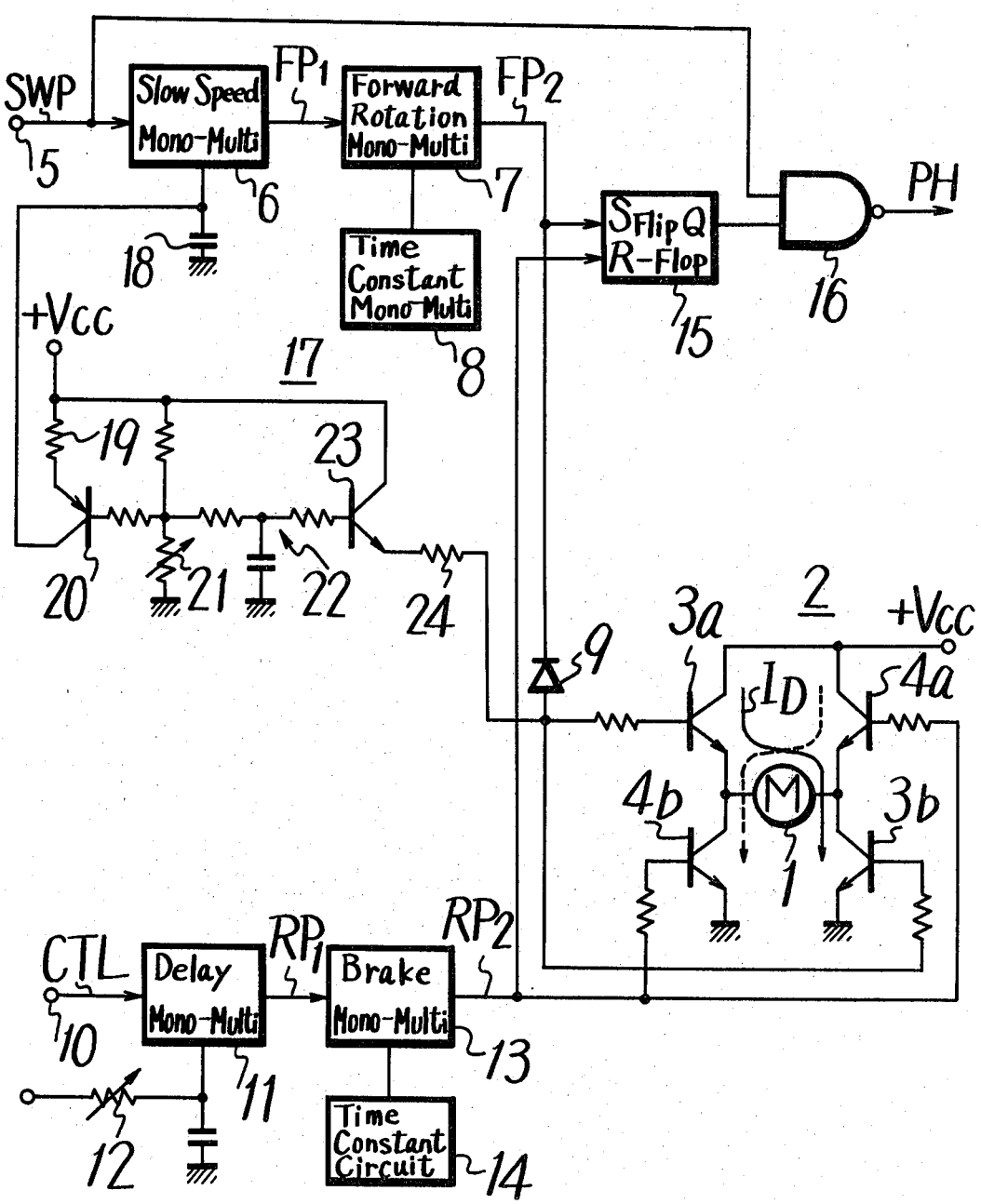
FIG. 1 is a connection diagram showing an example of the tape transportion control circuit used in the apparatus in accordance with the present invention.

The slow-motion picture reproducing apparatus according to this invention will be explained with reference to the figures, in which a pair of rotary heads HA and HB having air gaps with different azimuth angles are provided to record and reproduce video signals in adjacent or alternate tracks, respectively, in order to minimize cross-talk while permitting an increase in the recording density. A magnetic tape is wrapped helically about a portion of the perimeter of the guide drum and is moved longitudinally while the heads are rotated, thus causing the heads HA and HB alternately to scan respective tracks on the tape for recording the video signals thereon and reproducing the video signals therefrom. In a VTR (video tape recorder), an additional rotary head HA' having an air gap with the same azimuth angle as for example, main rotary head HB is provided which substantially scans the same track as that scanned by main rotary head HB.

For slow-motion reproduction of the recorded video signals, the tape is intermittently advanced by a predetermined number of tracks corresponding to, for example one frame, at predetermined time intervals according to a slow-motion ratio or slow-motion speed. When the tape is stopped, the video signals are alternately reproduced with main rotary head HA and auxiliary rotary head HA', while the video signals are alternately reproduced with the two main rotary heads HA and HB when the tape is transported. In FIG. 1, a capstan motor 1, which is for example, a D.C. motor, is provided to transport the tape in a forward or reverse direction. Capstan motor 1 is controlled by a motor drive circuit 2 which is basically constituted by a transistor bridge circuit comprising transistors 3a, 3b, 4a and 4b. In order to drive motor 1 in the forward direction, transistors 3a and 3b are made ON in order for DC current $I_D$ to flow therethrough as indicated by the solid line of FIG. 1. On the other hand, in order to drive motor 1 in the reverse direction, transistors 4a and 4b are made ON in order to reverse the flow of DC current $-I_D$ therethrough as indicated by the broken line of FIG. 1. The reverse DC current is used for braking so as to stop capstan motor 1 at a given position accurately. Transistors 3a and 3b are made ON by a forward pulse $FP_2$ derived from a forward rotation mono-multi (monostable multi-vibrator) 7, while transistors 4a and 4b are made ON by a reverse pulse $RP_2$ delivered from a brake mono-multi 13.

Additionally, a pulse generator (not shown) is provided which is connected to an axis of the rotary heads for detecting an angular phase of the heads. The pulse generator produces an RF switching pulse SWP, shown in FIG. 2A, which is supplied to an input terminal 5. Switching pulse SWP has a period of one frame and is fed to a slow speed mono-multi 6 which is triggered at the falling-down edge of switching pulse SWP. In FIG. 2A the scanning periods of heads HA, HB and HA' are indicated, respectively. The time constant of the slow-motion speed mono-multi 6 is determined in accordance with the slow speed as indicated by the slow-motion ratio (1/N), and in this example N is set at 3 (N=3). Therefore, the mono-multi 6 produces a pulse $FP_1$ which has a pulse width longer than two frame periods but shorter than three frame periods as shown in FIG. 2B.

The output pulse $FP_1$ derived from mono-multi 6 is fed to forward rotation mono-multi 7 and mono-multi 7 generates forward pulse $FP_2$ which is coincident with pulse $FP_1$ in the rising-up edge and has a pulse width of $T_f$ which is determined by a time constant circuit 8. Forward pulse $FP_2$ is applied to the cathode of a diode 9 which has the anode connected to the bases of transistors 3a and 3b through base resistors, respectively.

A reproduced control signal CTL is fed to an input terminal 10. The control signal is recorded on a control track which is provided as a longitudinal track on the magnetic tape along its lower edge wherein control signal CTL is recorded with the frame period. As shown in FIG. 2D, control signal CTL is generated when the magnetic tape is transported by forward rotation pulse $FP_2$ at a normal speed. Control signal CTL is supplied to a delay mono-multi 11 to trigger it so that delay mono-multi 11 generates a pulse $RP_1$ which has the pulse width of $\tau$ as shown in FIG. 2E. A tracking volume 12 is provided so as to vary the time constant of the delay mono-multi 11 and hence to vary pulse width $\tau$. Pulse $RP_1$ derived from delay mono-multi 11 is fed to brake mono-multi 13 to trigger it at the falling-down edge of pulse $RP_1$ so that brake mono-multi 13 produces a reverse pulse $RP_2$. A time constant circuit 14 is connected to brake mono-multi 13 to restrict a pulse width $T_r$ of reverse pulse $RP_2$ derived from brake mono-multi 13 as shown in FIG. 2F. Reverse pulse $RP_2$ is fed through base resistors to the bases of transistors 4a and 4b in motor drive circuit 2, respectively.

By using forward pulse $FP_2$ (shown in FIG. 2C) and reverse pulse $RP_2$ (shown in FIG. 2F), the drive current $I_D$, shown in FIG. 2G, flows through capstan motor 1. During the period in which drive current $I_D$ is positive capstan motor 1 is rotated in the forward direction and the tape is transported at the normal speed. Even when positive drive current $I_D$ disappears, capstan motor 1 remains in rotation due to its inertia. When negative drive current $-I_D$ is applied to capstan motor 1, the braking force is applied thereto substantially instantaneously and the magnetic tape is stopped at a given position. This stop position is selected such that the level of a reproduced output becomes maximum at the substantial center of one field. If a noise band, due to the small level of the reproduced output, appears at the center portion of a reproduced slow-motion picture, tracking value 12 is used to vary pulse $\tau$ to thereby adjust the stop position.

When two different tape speeds occur during recording, the pitch of the video tracks becomes different according to the different speeds. Therefore, it is necessary automatically to discriminate the recording speed based on, for example, the frequency of the control signal. The time constants of time constant circuits 8 and 14 are changed in accordance with the discriminated result and thereby set pulse widths $T_f$ and $T_r$ of forward and reverse pulses $FP_2$ and $RP_2$ respectively at an optimum value.

FIG. 3 shows one example of a circuit which amplifies reproduced outputs from rotary heads HA, HB and HA'. In this example, the reproduced outputs from rotary heads HA, HB and HA' are respectively fed to pre-amplifiers 32, 33 and 34 through rotary transformers (not shown). The output from pre-amplifier 32, connected to rotary head HA, is delivered through a head amplifier 35 to an output terminal 36. The output terminal of pre-amplifier 33 connected to rotary head HB, is connected to one input terminal 38a of a switching circuit 37, and the output terminal of pre-amplifier 34, connected to auxiliary head HA', is connected to another input terminal 38b of switching circuit 37 which has an output terminal 38c connected through a head amplifier 40 to an output terminal 41. Switching circuit 37 is controlled by a head change-over pulse PH (described later) applied thereto through a terminal 39 so that when pulse PH is at a high level, terminals 38b and 38c are connected, while when pulse PH is at a low level, terminals 38a and 38c are connected, respectively.

Referring to FIG. 1, head change-over pulse PH is produced from a NAND gate 16 which is supplied with the output from a flip-flop 15 and switching pulse SWP. Flip-flop 15 is set by forward pulse $FP_2$ and reset by reverse pulse $RP_2$, and produces an output pulse shown in FIG. 2H. Since this output pulse and switching pulse SWP (shown in FIG. 2A) are both fed to NAND circuit 16, NAND circuit 16 generates head change-over pulse PH which drops to a low level in response to switching pulse SWP during the scanning period of rotary head HB.

In accordance with the present invention, as exemplified in FIG. 1, a compensating circuit 17 is provided in connection with slow speed mono-multi 6 of the slow servo circuit. The time constant of slow speed mono-multi 6 is determined by a capacitor 18, a resistor 19 and a transistor 20. More particularly, as the base voltage of transistor 20 is varied by a slow speed volume 21 the time constant of slow speed mono-multi 6 is varied i.e. the pulse width of pulse $FP_1$ is varied. When the resistance value of volume 21 is selected as a low value in order to lower the base voltage of the transistor 20, the pulse width of pulse $FP_1$ becomes shorter and the speed of the tape for slow motion operation, hereinafter referred to as slow speed or slow-motion speed, becomes higher. In contrast thereto, when the resistance value of volume 21 is selected as a high value to raise the base voltage of transistor 20, the width of pulse $FP_1$ becomes longer and the slow speed becomes slower. The voltage produced across volume 21 is supplied through an integrating circuit 22, the base-emitter junction of transistor 23 and a resistor 24 to the anode of diode 9 as the compensating voltage.

Forward pulse $FP_2$ from forward mono-multi 7 is supplied to cathode of diode 9. As shown in FIG. 2C, forward pulse $FP_2$ has low levels in the intervals between the forward pulses, so that diode 9 becomes conductive therein. As a result, potentials at the bases of transistors 3a and 3b are at approximately 0 V, and thereby transistors 3a and 3b are kept in a nonconductive state. However, as soon as a forward pulse is supplied to the cathode of diode 9, diode 9 turns OFF and the compensating voltage from transistor 23 is fed to the bases of transistors 3a and 3b. When the compensating voltage becomes larger than the level of the forward pulse, diode 9 turns ON again and the compensating voltage is superimposed on the level of the forward pulse. As described above, the compensating voltage should be larger as the slow-motion speed becomes slower. In other words, as shown by the broken line of FIG. 4A, drive current $I_D$ for the capstan motor 1 becomes larger as the slow motion speed becomes slower. Thus deviations in the amount of tape intermittently advanced, as measured by a predetermined number of tracks, when the slow-motion ratio 1/N is changed, are compensated for by varying the amplitude of the motor drive pulse.

It is noted that integrating circuit 22 formed in compensating circuit 17 is provided such that when volume 21 is varied abruptly as shown in FIG. 4B by the solid line, the capstan motor 1 can not vary abruptly so as to avoid excessive compensation. Integrating circuit 22 also dulls the abrupt change as shown in FIG. 4B by the broken line.

An example in which the compensating voltage is supplied to motor drive circuit 2 will be now described with reference to FIG. 5. As shown in FIG. 5, a resistor 25 is connected between the base of transistor 3a and potential and a switch 26, which will become ON in the interval of forward pulse $FP_2$, is provided between compensating circuit 17 and the base of transistor 3a such that the compensating voltage is superimposed on forward pulse $FP_2$. Resistor 25 can be a variable resistor in order to adjust the level of the compensating voltage added to or subtracted from $FP_2$.

Further, in place of controlling the level of forward pulse $FP_2$ applied to motor drive circuit 2, and in order to compensate for deviations in the amount of tape intermittently advanced, as measured by a predetermined number of tracks, when the slow-motion ratio 1/N is changed, pulse width $T_f$ of forward pulse $FP_2$ can be controlled in association with the slow speed. FIG. 6 shows an example of the above case. Pulse width $T_f$ of forward pulse $FP_2$ from forward rotation mono-multi 7 is determined by the time constant of time constant circuit 8. This time constant is determined by a capacitor 27, resistors 28, 29, a variable resistor 30 and a transistor 31 of time constant circuit 8. By supplying the voltage generated from slow speed volume 21 to the base of transistor 31, the time constant of forward rotation mono-multi 7 can be varied in the same direction as the time constant variation direction of the slow speed mono-multi 6. Variable resistor 30 serves to set the initial value. If the resistance value of slow speed volume 21 is selected as a high value so as to set the slow speed slower, pulse width $T_f$ of forward pulse $FP_2$ from forward rotation mono-multi 7 is varied in a direction such that pulse width $T_f$ becomes wider so as to avoid, for low slow speeds, deterioration of the rising-up response of the capstan and reduction of the tape transportation amount.

Having described specific embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

We claim as our invention:

1. An apparatus for reproducing video signals recorded on tracks which are obliquely formed on a tape comprising:
    head means for scanning said tracks;
    tape capstan motor means for driving said tape in a longitudinal direction of the latter;
    tape driving means for generating a motor drive pulse, having a waveform shape as defined by a pulse width and a pulse amplitude, and a motor brake pulse which are applied to said tape capstan motor means and which respectively produced forward and reverse current flow through said tape capstan motor means effective for intermittently advancing said tape by an amount corresponding to a predetermined number of said tracks at time intervals which are determined in accordance with a selected slow-motion speed of advancement of said tape; and compensating means for varying the waveform shape of said motor drive pulse in accordance with said selected slow-motion speed.

2. An apparatus as in claim 1; wherein said tape driving means includes a first monostable multivibrator which produces an output signal and has a variable time constant circuit for determining the time interval between said motor drive pulses in accordance with said slow-motion speed.

3. An apparatus as in claim 2; wherein said tape driving means includes a second monostable multivibrator which is responsive to said output signal of said first monostable multivibrator and produces said motor drive pulse.

4. An apparatus as in claim 3; wherein said compensating means varies the pulse width of said motor drive pulse such that the pulse width of said motor drive pulse is respectively increased and decreased as the time interval between said motor drive pulses is increased and decreased.

5. An apparatus as in claim 4; in which said compensating means comprises a PNP-transistor having a base, emitter and collector and further wherein said base of said PNP-transistor and said variable time constant circuit of said first monostable multivibrator are supplied with a controllably variable DC voltage level whereby in accordance with variations in the level of said DC voltage said time interval between said motor drive pulses varies, and in which said collector of said PNP-transistor is connected to a variable time constant circuit of said second monostable multivibrator effective to vary the pulse-width of said motor drive pulse.

6. An apparatus as in claim 3; wherein said compensating means varies the pulse amplitude of said motor drive pulse such that the pulse amplitude of said motor drive pulse is respectively increased and decreased as the time interval between said motor drive pulses is increased and decreased.

7. An apparatus as in claim 6; wherein said compensating means comprises an NPN-transistor having a base, emitter and collector and further wherein said base of said NPN transistor and said variable time constant circuit of said first monostable multivibrator are supplied with a controllably variable DC voltage level whereby in accordance with variations in the level of said DC voltage said time interval between said motor drive pulses varies.

8. An apparatus as in claim 7; in which said motor drive pulse is supplied through a diode to said tape capstan motor means, and wherein said motor drive pulse is applied to a cathode of said diode and said emitter of said NPN-transistor is connected to an anode of said diode.

9. An apparatus as in claim 7; in which a DC potential provided by said emitter of sand NPN-transistor is supplied through a switch, having a conductive state and a non-conductive state, to said tape capstan motor means, and wherein during the period that said motor drive pulse is generated by said tape driving means said switch is in said conductive state.

* * * * *